Patented Sept. 1, 1925.

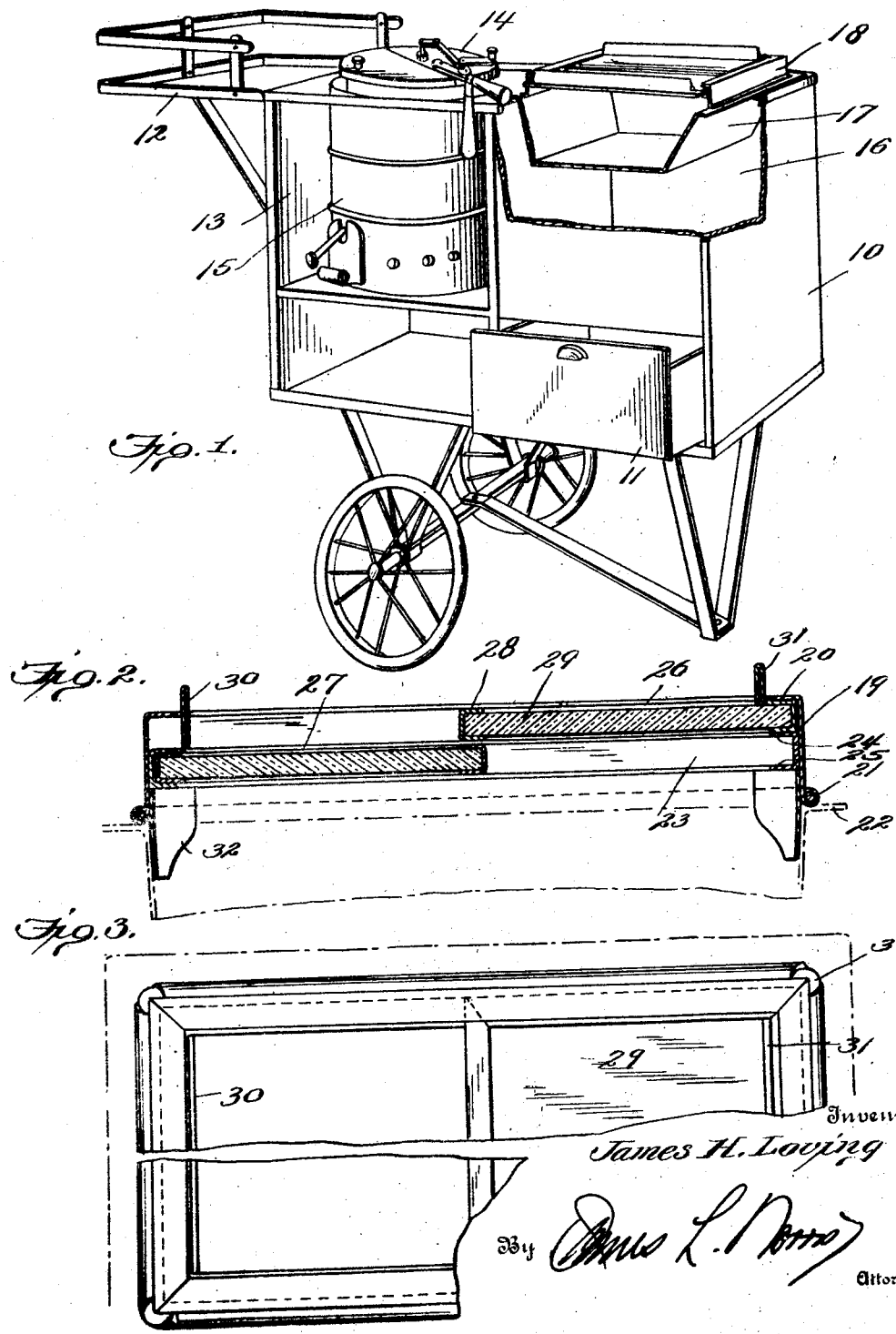

1,552,325

UNITED STATES PATENT OFFICE.

JAMES H. LOVING, OF MORRISTOWN, TENNESSEE.

POP-CORN MACHINE.

Application filed May 24, 1923. Serial No. 641,262.

*To all whom it may concern:*

Be it known that I, JAMES H. LOVING, a citizen of the United States, residing at Morristown, in the county of Hamblen and State of Tennessee, have invented new and useful Improvements in Pop-Corn Machines, of which the following is a specification.

The present invention relates to corn-poppers particularly to covers for the receptacle in which the corn is placed after being popped for keeping the popped corn warm while vending the same.

In corn-poppers of the character described now in use, such pans or receptacles are either left exposed to the air and to dirt and germs, rendering the device unsanitary or else a cover has been used which, when raised, will expose the entire contents of the pan to the above-named influences.

An object of the invention is to provide a cover for the popped corn receptacle, a portion of which may be manipulated so as to expose only such part of the contents to the air as is necessary for removing popped corn from the receptacle. In refilling the pan it is desirable that the entire pan should be uncovered and an object of the invention is to so construct the cover for the pan that it may be readily removed and replaced thereupon, and at the same time will not be accidentally displaced when moving the popped corn from place to place.

Another object of the invention is to so construct the cover that economy in time and material may be effected. The cover of my device is constructed of a frame to be placed upon the pan or receptacle being supported by the flanges thereof and having projecting members thereon extending into the pan to hold said frame in place. Within the frame are positioned two sliding panels adapted to slide in grooves or slideways arranged within the frame and lying in parallel planes.

Another object of the invention is to so construct the device that economy of material and simplicity of construction may be effected.

Other objects and advantages will appear in the following specification and claim.

In the drawings which constitute a part of the specification;

Figure 1 is a perspective view of a corn-popper of the type to which the invention relates.

Figure 2 is a longitudinal sectional view through the cover of the receptacle which constitutes the subject of the invention showing the manner of constructing the slideways for the cover members and the means on the cover members for manipulating the same.

Figure 3 is a plan view of the cover members arranged as shown in Figure 2.

Referring to the drawings in detail:

10 designates the casing of the corn-popping machine having a drawer 11 therein for containing material to be used by the vendor, a table 12 at one side for the convenience of the operator, a compartment 13 in which the corn-popper and the heating device therefor are placed, 14 designating the corn-popper and 15 the heating mechanism. In a compartment 16 adjacent thereto is located the pan or receptacle 17 for popped corn, said receptacle being suitably arranged for maintaining the contents thereof warm.

Placed upon the pan is the cover 18 which constitutes the subject of my invention. Said cover comprises an open frame 19 of metal or other suitable material, said frame being provided at its upper edge with an inturned flange 20 extending entirely around the frame. At the lower edge of the frame is formed an out-turned bead or flange 21 adapted to rest upon a similarly out-turned flange 22 on the upper edge of the pan or receptacle. Extending around the frame on the inside thereof and spaced a distance from the flange 20 is a member 23 U-shaped in cross-section to provide a slideway for one of the cover members hereinafter to be described. The flanges 24 and 25 of said member are spaced apart a distance equal to the distance of the upper flange 24 from the flange 20, in this manner forming two slideways of similar construction. The member 23 may be attached to the frame in any suitable manner as by the use of solder and in renewing, the covers may be removed by anyone familiar with the use of this attaching means. In each of the slideways so constructed is a cover plate, said plates being designated by the numerals 26 and 27 which are formed with metal frames 28 extending thereabout and protecting the edges of the transparent panels 29 of glass or other suitable material, the metal binding forming suitable sliding means and at the same time protecting the glass from being readily broken. On the upper side of the panels the metal frames 28 are provided with struck-up portions 30 and 31 extending the entire width of the opening in the frame 19 and being of such height that both of said members project approximately an equal distance above the plane of the flange 20. The provision of the members 30 and 31 extending the full width of the opening in the frame 19 is of importance in the construction of my device, in that it provides a grip that may be easily located by an operator either by night or by day. Soldered or otherwise secured within the walls of the member 19 are projecting lugs 32 so shaped as to adapt them to fit in the corners of said frame and positioned one at each corner thereof. These lugs project below the lower edge of the bead 21 and are adapted to fit in the corners of the pan 17, whereby the cover may be readily removed from the pan when desired and yet, when the pan is filled with the popped corn, it will not be displaced by the movement of the corn-popping device from place to place. The bead 21 may contain therein a stiffening wire 33 to provide rigidity.

From the foregoing description it will appear that I have provided a simple and efficient cover member for the popped corn receptacle of a corn-popper, one which will afford ready access to the pan or receptacle upon which it is placed and at the same time will maintain the contents of the pan in a sanitary and cleanly condition, a cover which is simple of construction, economical to manufacture, one which may be readily displaced from the receptacle when desired and yet which will not be accidentally displaced therefrom under ordinary working conditions and one which may be manipulated at night as well as in the daytime.

What I claim as new is:—

A cover adapted for the popped corn receptacle of a corn-popping machine, comprising a frame having an inwardly projecting flange surrounding its upper edge defining an open space, and an outwardly projecting bead surrounding its lower edge, a channelled member within said frame and providing spaced flanges extending inwardly from the walls of said frame, the upper flange of said member being spaced from the first named flange on the frame a distance equal to the space between the flanges of said member, providing slideways, slidable cover members located in said slideways and having struck-up portions projecting through said opening and extending the entire width thereof, and lugs in the corners of said frame below said channelled member, said lugs extending below said bead.

In testimony whereof I have hereunto set my hand.

JAMES H. LOVING.